US006811668B1

(12) United States Patent
Berndt et al.

(10) Patent No.: US 6,811,668 B1
(45) Date of Patent: Nov. 2, 2004

(54) APPARATUS FOR THE OPERATION OF A MICROFLUIDIC DEVICE

(75) Inventors: Manfred Berndt, Waldbronn (DE); Patrick Kaltenbach, Bischweier (DE); Colin B. Kennedy, Mill Valley, CA (US)

(73) Assignee: Caliper Life Sciences, Inc., Mountain View, CA (US)

(*) Notice: Subject to any disclaimer, the term of this patent is extended or adjusted under 35 U.S.C. 154(b) by 0 days.

(21) Appl. No.: 09/595,420

(22) Filed: Jun. 15, 2000

Related U.S. Application Data

(60) Provisional application No. 60/140,215, filed on Jun. 22, 1999.

(51) Int. Cl.[7] .......................... C02F 1/40; C02F 11/00; C25B 11/00; C25B 13/00; G01N 27/27

(52) U.S. Cl. .......................... 204/601

(58) Field of Search .......................... 204/601

(56) References Cited

U.S. PATENT DOCUMENTS

| | | | |
|---|---|---|---|
| 3,866,119 | A | 2/1975 | Ardezzone et al. |
| 4,726,929 | A | 2/1988 | Gropper et al. |
| 4,919,887 | A | 4/1990 | Wakatake |
| 5,030,418 | A | 7/1991 | Miyata |
| 5,049,359 | A | 9/1991 | Azuma et al. |
| 5,106,758 | A | 4/1992 | Adler et al. |
| 5,219,526 | A | 6/1993 | Long |
| 5,223,219 | A | 6/1993 | Subramanian et al. |
| 5,270,006 | A | 12/1993 | Uchigaki et al. |
| 5,304,487 | A | 4/1994 | Wilding et al. |
| 5,334,349 | A | 8/1994 | Kelln et al. |

(List continued on next page.)

FOREIGN PATENT DOCUMENTS

| | | | |
|---|---|---|---|
| AU | WO 0078454 A1 * | 6/2000 | ............ B01L/3/00 |
| CA | WO 0114064 A1 * | 10/2000 | ............ B01L/3/00 |
| EP | 0 006 031 | 12/1979 | |
| EP | 0 299 521 | 1/1989 | |
| EP | 0 616 218 | 9/1994 | |
| JP | 3-094158 | 4/1991 | |
| JP | 3-101752 | 4/1991 | |
| WO | WO 95/02189 | 1/1995 | |
| WO | WO 95/26796 | 10/1995 | |
| WO | WO 96/04547 | 2/1996 | |
| WO | WO 96/14934 | 5/1996 | |
| WO | WO 98/05424 | 2/1998 | |
| WO | WO 99/10735 | 3/1999 | |

OTHER PUBLICATIONS

Shoji and Esashi, "Microflow devices and systems", J. Micromech. Michroeng., 4 (1994) 157–171.*

*Primary Examiner*—Mark L. Bell
*Assistant Examiner*—Jennine Brown
(74) *Attorney, Agent, or Firm*—Donald R. McKenna

(57) ABSTRACT

In a system for operation or handling of a laboratory microchip (41) for chemical processing or analysis, the microchip (41) is mounted in a first physical unit (42). The microchip (41) is arranged on a mounting plate, such that it is readily accessible from the top and thus the fitting and removal of the microchip is considerably simplified. Furthermore, the first physical unit (42) comprises an optical device (43) for contactless detection of the results of the chemical processes conducted on the microchip. The supply systems necessary for the operation of the microchip are arranged in a module unit that has a separable connection with a second physical unit. The proposed modular layout enables ease of interchangeability of the required supply systems and thus, overall, ease of adaptability of the proposed system for various types of microchips.

13 Claims, 9 Drawing Sheets

U.S. PATENT DOCUMENTS

| | | | | | |
|---|---|---|---|---|---|
| 5,344,326 | A | | 9/1994 | Ferris | |
| 5,443,790 | A | | 8/1995 | Coeurveille et al. | |
| 5,444,386 | A | | 8/1995 | Mizumura | |
| 5,486,335 | A | | 1/1996 | Wilding et al. | |
| 5,489,414 | A | | 2/1996 | Schreiber et al. | |
| 5,498,392 | A | | 3/1996 | Wilding et al. | |
| 5,501,838 | A | | 3/1996 | Ootani et al. | |
| 5,510,082 | A | | 4/1996 | Arai et al. | |
| 5,519,635 | A | | 5/1996 | Miyake et al. | |
| 5,537,051 | A | | 7/1996 | Jalloul et al. | |
| 5,571,410 | A | * | 11/1996 | Swedberg et al. | 204/451 |
| 5,603,351 | A | | 2/1997 | Cherukuri et al. | |
| 5,716,825 | A | | 2/1998 | Hancock et al. | |
| 5,857,866 | A | | 1/1999 | Felps | |
| 5,858,195 | A | | 1/1999 | Ramsey | |
| 5,863,801 | A | * | 1/1999 | Southgate et al. | 422/101 |
| 5,955,028 | A | * | 9/1999 | Chow | 204/600 |
| 5,989,402 | A | * | 11/1999 | Chow et al. | 204/450 |
| 6,041,515 | A | | 3/2000 | Ally et al. | |
| 6,071,478 | A | | 6/2000 | Chow | |
| 6,239,590 | B1 | | 5/2001 | Krivy et al. | |
| 6,246,250 | B1 | | 6/2001 | Doherty et al. | |
| 6,495,104 | B1 | * | 12/2002 | Unno et al. | 422/68.1 |

* cited by examiner

APPARATUS FOR THE OPERATION OF A MICROFLUIDIC DEVICE

CROSS REFERENCE TO RELATED APPLICATION

This application claims priority from U.S. Provisional Patent Application No. 60/140,215, filed Jun. 22, 1999, which is hereby incorporated herein by reference in its entirety for all purposes.

BACKGROUND OF THE INVENTION

Microfluidic devices and systems are gaining wide acceptance as alternatives to conventional analytical tools in research and development laboratories in both academia and industry. This acceptance has been fueled by rapid progress in this technology over the last several years.

The rapid progress in this field can best be illustrated by analogy to corresponding developments in the field of microelectronics. In the field of chemical analysis, as in microelectronics, there is a considerable need for integration of existing stationary laboratory installations into portable systems and thus a need for miniaturization. A survey of the most recent developments in the field of microchip technology can be found in a collection of the relevant technical literature, edited by A. van den Berg and P. Bergveld, under the title of "Micro Total Analysis Systems," published by Kluwer Academic Publishers, Netherlands, 1995. The starting point for these developments was the already established method of "capillary electrophoresis". In this context, efforts have already been made to implement electrophoresis on a planar glass micro-structure.

Microfluidic technologies have begun to gain acceptance as commercial research products, with the introduction of the Agilent 2100 Bioanalyzer and Caliper LabChip® microfluidic systems. With the advent of such commercial products, it becomes more important that users be allowed more flexibility and value for their research money, allowing broader applicability of these systems. The present invention is directed to meeting these and a variety of other needs.

In an article which is reproduced in the above-mentioned collection of relevant technical literature. by Andreas Manz et al, the above-mentioned backgrounds are extensively described. Manz et al. have already produced a microchip consisting of a layering system of individual substrates, by means of which three-dimensional material transport was also possible.

Through production of a micro-laboratory system on a glass substrate, the above-mentioned article also described systems which utilized a silicon-based micro-structure. On this basis, integrated enzyme reactors, for example for a glucose test, micro-reactors for immunoassays and miniaturized reaction vessels for a rapid DNA testing have allegedly been carried out by means of the polymerase chain reaction method.

A microchip laboratory system of the above type has also been described in U.S. Pat. No. 5,858,195, in which the corresponding materials are transported through a system of inter-connected conduits, which are integrated on a microchip. The transport of these materials within these conduits can, in this context, be precisely controlled by means of electrical fields which are connected along these transport conduits. On the basis of the correspondingly enabled high-precision control of material transport and the very precise facility for metering of the transported bodies of material, it is possible to achieve precise mixing, separation and/or chemical or physicochemical reactions with regard to the desired stoichiometrics. In this laboratory system, furthermore, the conduits envisaged in integrated construction also exhibit a wide range of material reservoirs which contain the materials required for chemical analysis or synthesis. Transport of materials out of these reservoirs along the conduits also takes place by means of electrical potential differences. Materials transported along the conduits thus come into contact with different chemical or physical environments, which then enable the necessary chemical or physicochemical reactions between the respective materials. In particular, the devices described typically include one or several junctions between transport conduits, at which the inter-mixing of materials takes place. By means of simultaneous application of different electrical potentials at various material reservoirs, it is possible to control the volumetric flows of the various materials by means of one or several junctions. Thus, precise stoichiometric metering is possible purely on the basis of the connected electrical potential.

By means of the above-mentioned technology, it is possible to perform complete chemical or biochemical experiments using microchips tailor-made for the corresponding application. In accordance with the present invention, it is typically useful for the chips in the measurement system to be easily interchangeable and that the measurement structure be easily adapted to various microchip layouts. In the context of electrokinetically driven applications, this adaptation first typically relates to the corresponding arrangement of reservoirs and the electrical high voltages required for transportation of materials on the chip and to the corresponding application of these voltages to the microchip. For that reason, a laboratory environment of this type typically includes leading of electrodes to the corresponding contact surfaces on the microchip, and arrangements for the feeding of materials to the above-mentioned reservoirs. In this context it must particularly be taken into account that the microchips exhibit dimensions of only a few millimeters up to the order of magnitude of a centimeters, and are thus relatively difficult to handle.

SUMMARY OF THE INVENTION

In a first aspect, the present invention provides a system for analysis or synthesis of materials. The system comprises a first physical unit with a mounting region for receiving a microfluidic device. At least one second physical unit is spatially separated from the first physical unit and comprises a material transport system that includes at least a first interface component. The first physical unit and second physical unit are oriented with respect to each other whereby the material transport system provides a potential to the microfluidic device through the first interface component to transport material through the microfluidic device. The first interface component is removable from the second physical unit.

DETAILED DESCRIPTION OF THE INVENTION

I. Microchip Laboratory Systems

The present invention relates in general to microchip laboratory systems used in the controlled implementation of chemical, physicochemical, physical, biochemical and/or biological processes. More specifically the present invention relates to microchip laboratory systems for the analysis or synthesis of materials, and particularly fluid borne materials, within a microfluidic device or structure, by electrical, electromagnetic or similar means. In particular, the invention relates to a system for the operation and handling of a laboratory microchip. In general, the invention comprises a means or region for mounting of the microchip and means or interface for providing a potential required for the microfluidic transportation of materials on the microchip. As used herein, the term "potential" generally refers to an energy potential that may be supplied by, e.g., electrical sources, pressure sources, thermal sources or the like. The region for mounting the microchip is typically arranged within a first physical unit, e.g., a base unit, and is configured to receive the microfluidic device, e.g., by means of a well, barrier or barriers, slots, or other structural features that allow the microfluidic device to be fittedly placed and/or positioned on the mounting region. The at least first supply system or means is arranged within a spatially separate second physical unit, e.g., a cover unit, whereby the first physical unit and the at least second physical unit are oriented with respect to each other, e.g., they can be fit together, to allow for operation of the microchip, e.g., by interfacing the supply system with the microfluidic device. Generally speaking, a supply system may supply potential, or materials or a combination of the two to the microfluidic device.

Figure 1:
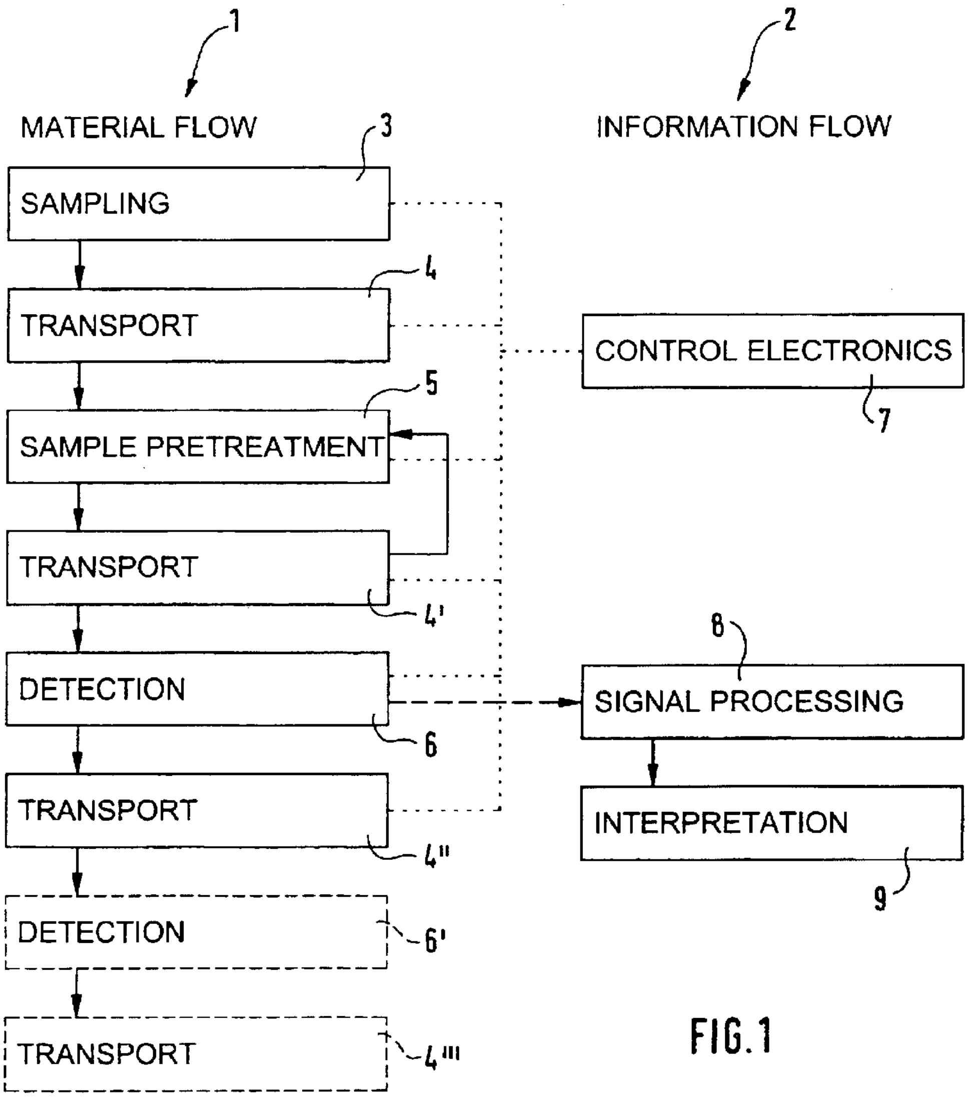
FIG. 1 schematically illustrates the functional components required for a laboratory microchip system, illustrated in block diagram form.

The operational components typically used for the microchip systems described herein are schematically illustrated in FIG. 1. These are mainly subdivided into the components relating to material transport or flow 1, and those which represent the information flow 2 arising upon execution of a test. Material flow 1 typically includes sampling operations 3 and operations for transporting 4 materials on the chip, as well as optional operations for treatment or pretreatment 5 of the materials to be examined. Furthermore, a sensor system 6 is typically employed to detect the results of a test, and optionally to monitor the material flow operations, so that adjustments can be made in controlling material flow using the control system. One example of the control mechanism is shown as control electronics 7.

Data obtained in the detection operation 6 and 6' is transferred typically to the signal processing 8 operation so that the detected measurement results can be analyzed. A priority objective in the design of such microchip systems is the provision of function units/modules corresponding to the above-mentioned functions and the establishment of suitable interfaces between individual modules. By means of a suitable definition of these interfaces, it is possible to achieve a high degree of flexibility in adaptation of the systems to various microchips or experimental arrangements. Furthermore, on the basis of such a strictly modular system structure, it is possible to achieve the most extensive level of compatibility between various microchips and/or microchip systems.

Figure 2:
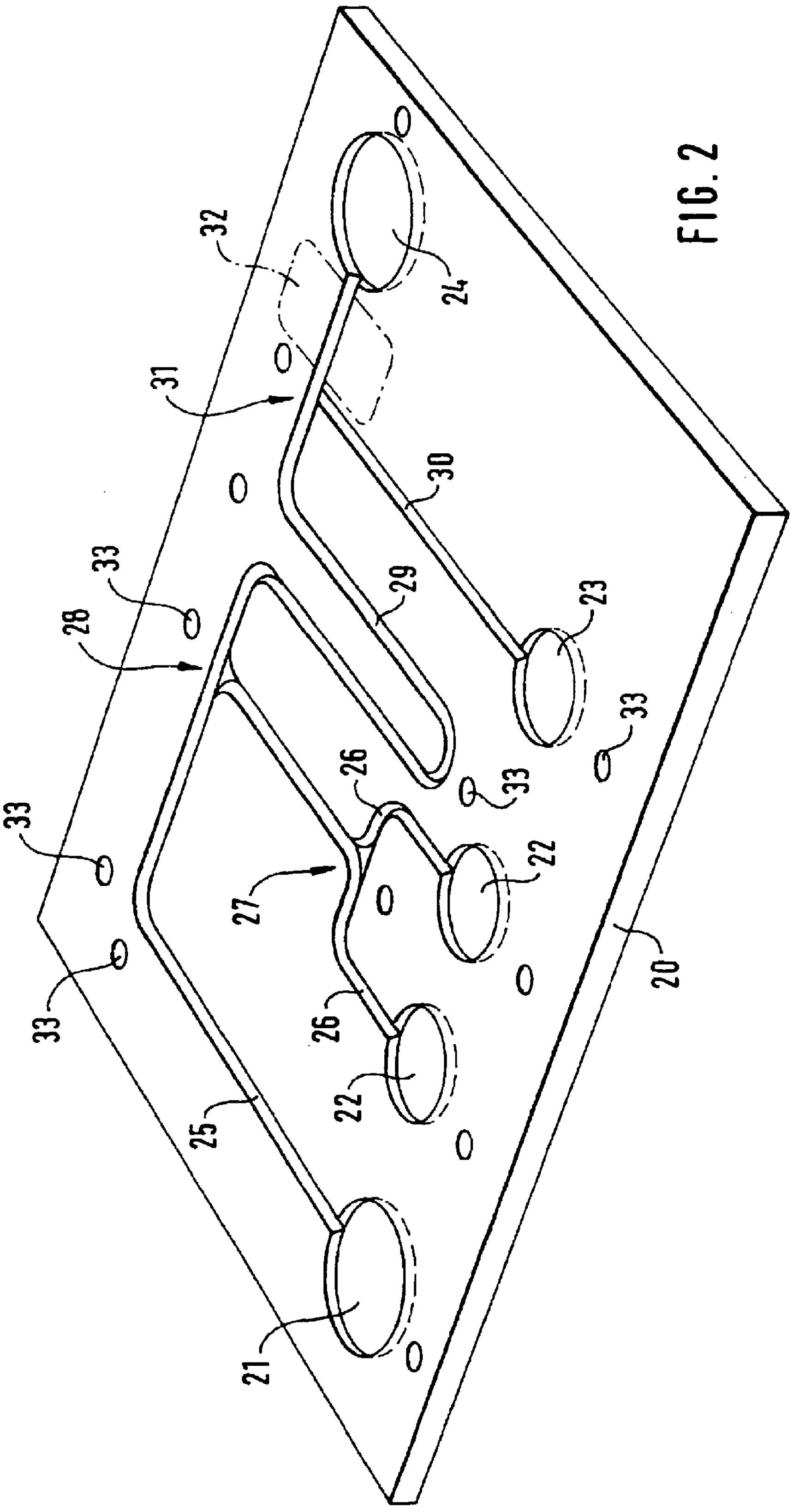
FIG. 2 schematically illustrates a laboratory microchip for utilization in a system according to the invention.

Further incentives for miniaturization in the field of chemical analysis include the ability and desirability to minimize the distance and time over which materials are transported. In particular, the amount of time and distance required to transport materials between the sampling of the materials and the respective detection point of any chemical reaction that has taken place is minimized (FIG. 2). It is furthermore known from the field of liquid chromatography and electrophoresis that separation of materials can be achieved more rapidly and individual components can be separated with a higher degree of resolution than has been possible in conventional systems. Furthermore, micro-miniaturized laboratory systems enable a considerably reduced consumption of materials, particularly reagents, and a far more efficient intermixing of the components of materials.

Pre-published international patent application WO 98/05424 describes an arrangement for the handling of a microchip which is already of modular construction. The transport of materials by means of high electrical voltage represents only one variant of further conceivable solution concepts. For example, the potential difference required for transport of materials can also be brought about by application of a pressurized medium, ideally compressed air on the materials, or another suitable gas medium such as, for example, inert gas, or by application of negative pressures or vacuum. Furthermore, materials can be transported by means of application of a suitable temperature profile, in which context transportation takes place by means of thermal expansion or compression of the respective material.

The choice of the respective medium for provision of a potential or of a force for transport of materials on the microchip will therefore be guided according to the physical characteristics of the materials themselves, as well as the nature of the analysis and/or synthesis that is desired to be carried out. In the case of materials with charged particles, for example charged or ionized molecules or ions, transportation of materials ideally takes place by means of an electrical or electromagnetic field of suitable strength, e.g., via electrophoresis. The distance covered by the materials is dictated by the field strength and (chronological) time duration of the applied field. In the case of materials free of electrical charge, transportation is ideally performed by means of a flow medium, for example compressed gas, or applied vacuum, although electrically driven transport, e.g., electroosmosis, is also optionally employed. Because of the very small dimensions of the transport conduits on the microchip, for positive or negative pressure based transport, only relatively low volumes of air, on the order of magnitude of picoliters, will be required. In the case of materials with a relatively high coefficient of thermal expansion, a thermal process for the transportation of materials can be employed, preferably provided that the resultant temperature increase exerts little or no relevant influence on the reaction kinetics taking place in the respective test.

Due to the possible complexity of the reactions being carried out, the number of necessary contact electrodes may be relatively high, e.g., from about 4, 10, hundreds or even more. Furthermore, the materials can be moved in transport conduits of any given spatial configuration. For further control or adjustment of the precise flow speeds of the materials, in the case of hollow conduits liquid or gel-type buffer media may be employed that alters the flow speeds through such conduits, e.g., because of viscosity or increased flow resistance. On the basis of transport of charged molecules through such a gel, it is possible to adjust flow speeds with particularly high precision by means of the connected electrical fields. Furthermore, there is the option of providing the required reagents for the test or even the materials themselves which are to be examined, predisposed on the microchip.

Using a buffer gel or a buffer solution, mixtures of charged molecules can advantageously be transported through the medium by means of an electrical field. For precise separation of materials and correspondingly precisely timed introduction of the respective materials, several electrical fields can be simultaneously or consecutively activated, with different time gradients as appropriate. This also makes it possible to achieve complex field distributions for fields which migrate over the separation medium. Charged molecules which migrate with a higher degree of mobility through a gel than other materials can thus be separated from slower materials of lesser mobility. In this context, the precise spatial and temporal distribution of fields can be achieved by corresponding control or computer programs.

For the above-mentioned microfluidic technology, furthermore, consideration is additionally being given to the use of micro-mechanical or micro-electromechanical sensor systems, for example using micro-mechanical valves, motors or pumps. A corresponding survey of possible future technologies in this environment is given in a relevant article from Caliper Technologies Corp., which can be downloaded from the Internet at "www.calipertech.com".

Presuming the acceptance of this new technology by the relevant circles of users involved, these microchips will rapidly come into use as commercial products and as rapid tests in the field of laboratory diagnostics or clinical diagnostics. For that reason there is a considerable demand for a laboratory arrangement for practical handling and operation of such a microchip. First, this arrangement simplifies the handling of chips such that they can also be used in the above-mentioned laboratory environment by chemistry or biology laboratory technicians having relatively little experience with the minimal complications. Secondly, a corresponding widespread application of such microchips and a relatively simple and rapid analysis of measurement results is made possible. In addition to practical and straightforward ease of handling of the microchips, the user does not need any more than the minimum of skill in the operation of the above-mentioned supply systems, particularly with reference to any requirement for higher voltage or any further technical equipment. Furthermore, a corresponding test layout also provides detection devices suitable for logging of the measurement results, such as those which enable automatic detection of the measured data and digitally outputting these data at the output of the measurement system.

II. Modular Construction of Microchip Laboratory Systems

In a system according to the invention, the above-mentioned objectives for operation and for handling of a laboratory microchip, which when used in the microscale analysis and/or synthesis of fluidic materials is referred to herein as a microfluidic device, are fulfilled by arrangement of the first supply system within a module unit which is separably connected with the second physical unit. The described modular layout thus primarily enables ease of interchangeability of the required means of supply for provision of the necessary potentials/forces for microfluidic movement of materials on the microchip, e.g., electrical fields, and thus, overall, ease of adaptability of the device for various types of the microchip. Thus, the device offers flexible utilization for various experimental layouts and a corresponding variety of microchips.

The module unit is preferably designed as an insertable cassette or cartridge. The installation as a whole can be configured as a permanently installed system or as a portable system for mobile implementation of an experiment onsite, for example close by a medical patient. In a preferred embodiment, the proposed module unit includes the above-mentioned first supply system, e.g., a transport system, in which context the materials required for the corresponding experiment can also be fed separately to the microchip. Alternatively, however, materials can also be transported to the microchip by means of a second supply system and/or unit which is preferably arranged within the proposed module unit as well.

It is emphasized that both the first and the second supply systems can contain either electrical conductors and/or hollow conduits, by means of which the required potential, and/or the required materials are fed to the microchip whereby the actual sources of potential or materials are provided by means of a further basic supply unit (see below). In certain instances, the supply means serve to provide material as well as the necessary potential to the microfluidic devices(again, see below).

In case of feeding of materials by means of second supply means, it can further be envisaged that the first and second supply means commonly exhibit feeding means, preferably hollow conduits or hollow electrodes, for feeding of the potential or potentials required for transportation of materials on the microchip, as well as for supply to the microchip of the materials required for operation of the microchip. These materials may also be the samples themselves. This makes it possible to achieve a considerable reduction in the quantity of necessary feed lines for the potential or potentials required for transfer or for feed of materials, even enabling them to be reduced by a factor of 2, which is particularly significant in the case of microfluidic devices which are already equipped with a relatively large number of contact electrodes or access ports for same, and openings for feeding of materials.

In accordance with a further aspect of the invention, it will be understood that the module unit which has a separable connection with the second physical unit can exhibit an integrated supply system for the microchip with an electrical power supply, compressed gas supply, temperature supply etc. The proposed module unit in this embodiment thus exhibits all of the supply elements/units required for microchip operation. In the case of transportation of materials on the microchip by means of electrical forces, in this context, an electrical power supply, also miniaturized, may be included: one which can be implemented with known microelectronic as a high-voltage power supply within a module unit as proposed. In the case of transportation of materials on the microchip by means of a gas medium, a corresponding compressed gas supply system is optionally provided within the module unit. Because of the relatively low volumes of gas relating to the miniaturized transport conduits on the microchip, it is also possible to reduce the size of the compressed gas supply, and in particular the gas reservoir, such that it can be fully integrated into a corresponding module unit. The same is applicable for a temperature supply system for purposes of thermally induced transportation of materials.

In accordance with a further embodiment of the device according to the invention, the module unit optionally includes an application-related basic supply unit for the corresponding microchip/microfluidic device. In this embodiment, the module unit comes ready-equipped with all reagents required for the experiment to be performed and with the necessary integrated supply system for transportation of materials on the microchip, so that only the materials to be examined remain to be fed to the microchip.

In a further advantageous embodiment of the system according to the invention, the module unit includes an intermediate interface component for bridging supply lines of the first supply system and corresponding supply lines on the microchip. The advantage of this increased modular layout is, in particular, that the supply lines of the first supply means are no longer directly in contact with the corresponding conduits of the microchip and are thus subject to no dirtying and wear & tear. This is because only the conduits of the intermediate interface component come into contact with the corresponding lines or interface elements of the chip. Furthermore, the intermediate interface component enables straightforward spatial adaptation of the supply lines to various microchip layouts.

In particular, the intermediate interface component can be separably mounted on/in the module unit, and it is preferably mounted on/in the module unit by means of a bayonet fitting (catch). Alternatively, however, mounting can also be accomplished by means of conventional mounting devices such as clamps, clips, slots (e.g., standard commercial mountings or insertion devices for credit cards, particularly chip cards) etc.

The information required for detection and analysis of reactions which take place, e.g., by receiving and recording a detectable signal indicative of the reaction, i.e., optical signals, electrochemical signals, etc., furthermore, can be detected by means of a detection or measurement system which is preferably arranged within the physical unit in which the microchip is also mounted. This embodiment therefore provides for additional modularity of the entire layout. For example, the results of a reaction can be analyzed by means of a laser spectrometer which is arranged in or on the first physical unit underneath the microchip. Even more advantageously, this analysis unit can be separably connected with the first physical unit in order to enable the highest possible degree of flexibility in data analysis, e.g., through interchangeability of detection systems. Thus, for example, it is possible to provide various laser spectrometers which perform sensing in different wavelength ranges, or, for example, it is possible to replace a laser spectrometer with an entirely different type of measurement system.

In order to achieve further simplification in the handling of the microchip in a system according to the invention, the first physical unit can further exhibit a mounting plate for the microchip. The described mounting plate is preferably arranged such that the microchip can be mounted from above onto this plate and thus the fitting of the microchip is considerably simplified, despite its relatively small dimensions.

Finally, as a further stage of modularity of the system according to the invention, a basic supply unit can be provided which constitutes a third physical unit and which is connected with the first and with the second physical unit. This physical unit can, for example, fulfill the function of supplying the entire device/measurement system with (high) voltage, compressed gas or with the materials and/or reagents required for the corresponding experimental test.

The functional components required for a laboratory microchip system of the present type and its functional operation during a test cycle are illustrated in diagrammatical form in FIG. 1, as briefly described above, with exemplary reference to the microchip as illustrated in FIG. 2. In this drawing, the distinction is made between the material flow 1 which arises in such a system, i.e. the materials to be examined and the correspondingly employed reagents, and the information flow 2, firstly in connection with the controlled transportation of individual materials on the microchip and secondly in connection with detection of test results.

Initially, in the area of material flow, the materials to be examined (possibly in addition to the reagents required for the corresponding test) are fed to the microchip 3. Thereafter, these materials on the microchip are moved or transported, e.g., by means of electrical forces 4. Both the feed and the movement of materials are brought about by means of a suitable electronic control 7, as indicated by means of the dotted line. In this example, the materials are subjected to preliminary treatment 5, before they undergo the test as such. This preliminary treatment may, for example, consist of pre-heating by means of a heating system or pre-cooling by means of a suitable cooling system in order, for example, to fulfill the required thermal test conditions. As is known, the temperature conditions for execution of a chemical test usually exert a considerable influence on the cycle of test kinetics. As is indicated by the arrow, this preliminary treatment can also take place in a multiple sequence, in which context there are obviated a pretreatment cycle 5 and a further transport cycle 4'. The above-mentioned pretreatment can in this instance, in particular, fulfill the function of separation of materials such as to access only certain specified components of the initial materials for the corresponding test. Essentially, both the material quantity (quantity) and the material speed (quality) can be determined by means of the transportation as described. In particular, precise adjustment of material quantity enables precise metering of individual materials and material components. Furthermore, the latter processes can advantageously be controlled by means of electronic control 7.

After one or more pre-treatments, the actual experimental test/examination takes place, in which context the test results can be detected on a suitable detection point of the microchip 6. Detection advantageously takes place by means of optical detection, e.g. a laser diode in conjunction with a photoelectric cell, a mass spectrometer, which may be connected, or by means of electrical detection. The resultant optical measurement signals are then fed to a signal-processing system 8, and thereafter to an analysis unit (e.g. suitable microprocessor) for interpretation 9 of the measurement results.

Following the above-mentioned detection 6, there is the option of implementation, as indicated by the dotted line, of further test series or analyses or separation of materials, e.g., those in connection with various test stages of a chemical test cycle which is, overall, more complicated. For this purpose, materials are transported onwards on the microchip after the first detection point 6, and to a further detection point 6'. There, the procedure theoretically defined according to stages 4' and 6 is performed. Finally, the materials are fed, after termination of all reactions/tests, to a material drain (not illustrated here) by means of a concluding transport cycle or collection cycle 4'''.

FIG. 2, as noted above, illustrates a typical laboratory microchip which is suitable for utilization in a system according to the invention. Initially, the technical setup of such a microchip is extensively described, because this has an important part to play in determining the structure of the system according to the invention, which will be described therein below. On the upper side of an illustrated substrate 20, microfluidic structures are provided, through which materials are transported. Substrate 20 may, for example, be made up of glass or silicon, in which context the structures may be produced by means of a chemical etching process or a laser etching process. Alternatively, such substrates may include polymeric materials and be fabricated using known processes such as injection molding, embossing, and laser ablation techniques. Typically, such substrates are overlaid with additional substrates in order to seal the conduits as enclosed channels or conduits.

For sampling of the material to be examined (hereafter called the "sample material") onto the microchip, one or several recesses 21 are provided on the microchip, to function as reservoirs for the sample material. In performing a particular exemplary analysis or test, the sample material is initially transported along a transport duct or channel 25 on the microchip. In this example, transport channel 25 is illustrated as a V-shaped groove for convenience of illustration. However, the channels of these microfluidic substrates typically comprise sealed rectangular (or substantially rectangular) or circular-section conduits or channels.

The reagents required for the test cycle are typically accommodated in recesses 22, which also fulfill the function of reagent and/or sample material reservoirs. In this example, two different materials could readily be manipulated. By means of corresponding transport conduits 26, these are initially fed to a junction point 27, where they intermix and, after any chemical analysis or synthesis has been completed, constitute the product ready to use. At a further junction 28, this reagent meets the material sample to be examined, in which the two materials will also inter-mix.

The material formed, then passes through a conduit section 29, which, as shown has a meandering geometry which functions to achieve artificial extension of the distance available for reaction between the material specimen and the reagent. In a further recess 23 configured as a material reservoir, in this example, there is contained a further reagent which is fed to the already available material mix at a further junction point 31.

The reaction of interest takes place after the above-mentioned junction point 31, which reaction can then be detected, ideally by contactless means, e.g., optically, within an area 32 (or measurement zone) of the transport duct by means of a detector which is not illustrated here. In this context, the corresponding detector can be located above or below area 32). After the material has passed through the above-mentioned area 32, it is fed to a further recess 24, which represents a waste reservoir or material drain for the waste materials which have been produced, overall, in the course of the reaction.

Finally, on the microchip there are provided recesses 33 which act as contactless surfaces for application of electrodes and which in turn enable the electrical voltages, and even high voltages, required for connection to the microchip for operation of the chip. Alternatively, the contacting for the chips can also take place by means of insertion of a corresponding electrode point directly into the recesses 21, 22, 23 and 24 provided as material reservoirs. By means of a suitable arrangement of electrodes 33 along transport conduits 25, 26, 29 and 30 and a corresponding chronological or intensity-related harmonization of the applied fields, it is then possible to achieve a situation in which the transportation of individual materials takes place according to a precisely dictated time/quantity profile, such that it is possible to achieve very precise consideration of and adherence to the kinetics for the underlying reaction process.

In pressure driven transport of materials within the microfluidic structure, it is typically necessary to make recesses 33 such that corresponding pressure supply conduits closely and sealably engage them so as to make it possible to introduce a pressurized medium, for example an inert gas, into the transport conduits, or apply an appropriate negative pressure.

Figure 3:
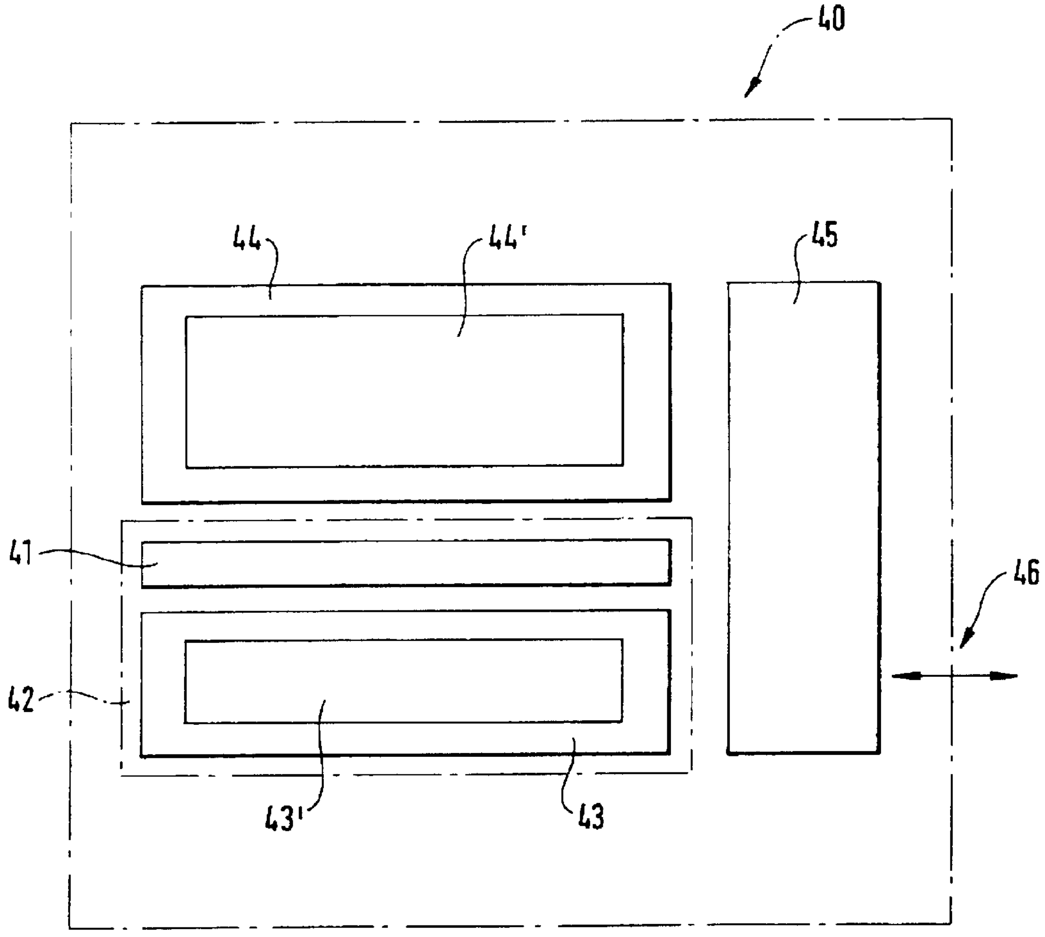
FIG. 3 schematically illustrates an overview diagram of a first exemplary embodiment of the system according to the invention.

The general setup of a system according to the invention is now described by the block diagram depicted in FIG. 3. Here, the individual components of the entire system 40 are constructed on a strictly modular basis such as to achieve the maximum possible flexibility in operation of the system. The microchip 41 is accommodated in a first physical unit 42 and is preferably arranged on a mounting plate (illustrated in FIGS. 4 and 5*d*), such that the microchip 41 has ease of access from the top and its installation and removal is greatly simplified as the result. Furthermore, as a further section of the first physical unit 42, a mounting 43 is provided for an optical device 43' for contactless detection of the results of the tests performed on microchip 41, particularly the chemical reactions that take place there. Preferably, the optical measurement device 43' constitutes a laser spectrometer; however, other forms of measurement system, such as, for example, a mass spectrometer or infrared sensor system, may be used.

The supply systems that provide the forces necessary for transportation of materials on the microchip are accommodated in a second physical unit 44, which is spatially separate from the first physical unit 42. Preferably, the supply systems are arranged in an insert or in a cartridge 44' or integrated in the same, with a separable connection to the second physical unit 44. It is possible to consider supply systems, in the context of transportation of materials by means of electrical forces, relating to a power supply and electrical contracts which bring about a conductive connection with the opposite electrodes 33 of the appropriate form as described in FIG. 2, as soon as the first and second modules are brought together. Within a third physical unit 45, further installations, e.g. a basic power supply or electronic analyzer for processing of the signals/data supplied by measurement installation 43, can be provided. Further, the data output from the measurement device 43 or from the electronic analyzer which is integrated into the third physical unit 45, are optionally accessible from outside via an analogue or digital data-processing interface 46.

Figure 4:
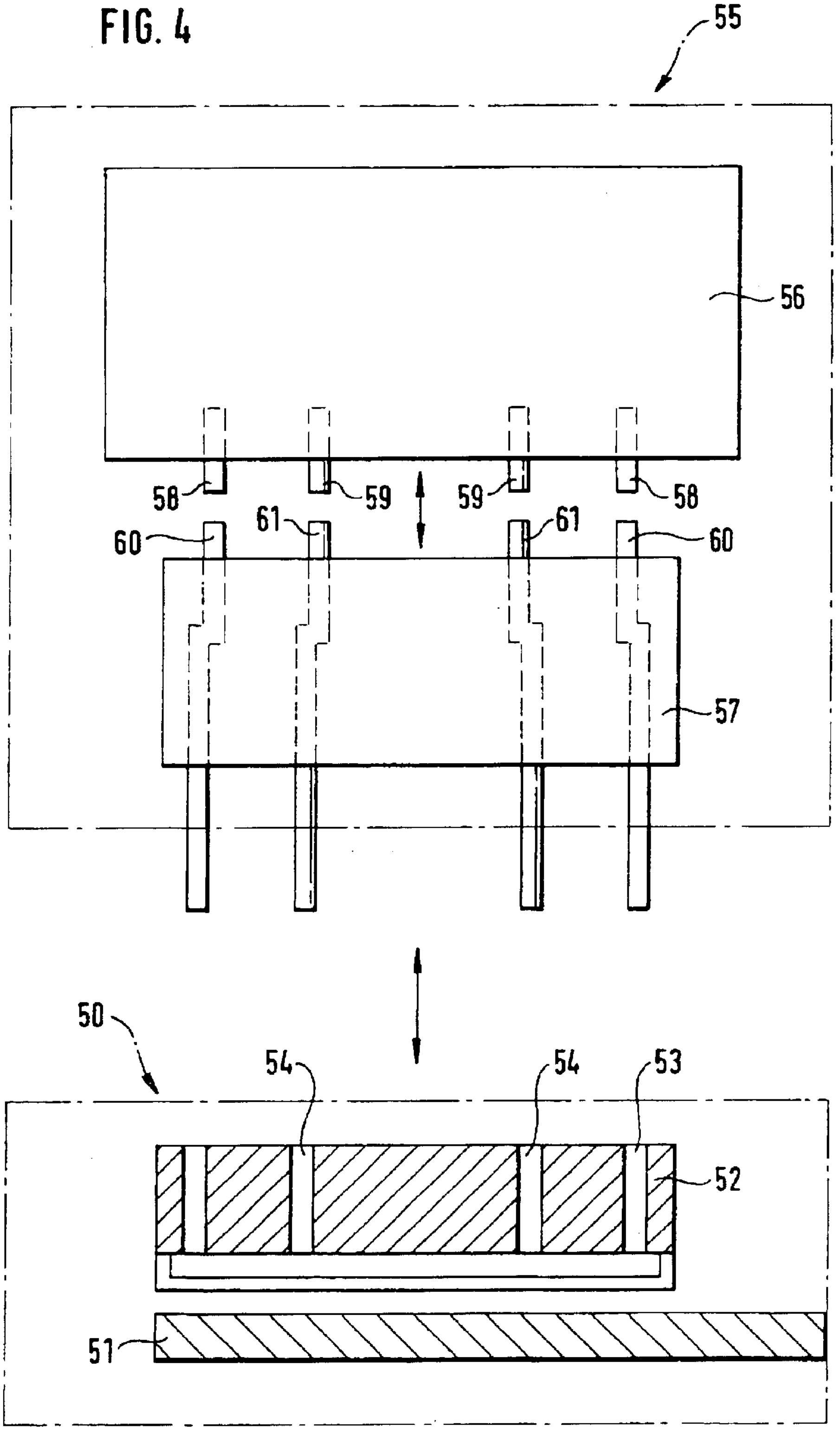
FIG. 4 schematically illustrates a block diagram corresponding to FIG. 3 of a second exemplary embodiment of the system according to the invention.

A further exemplary embodiment of the invention is now described on the basis of the illustration shown in FIG. 4 which shows a portion of the components already illustrated in FIG. 3. By analogy with the embodiment illustrated in FIG. 3, a first physical unit 50 is provided which comprises a mounting plate 51 for supporting a microchip 52. In this example, the microchip 52 comprises two different types of connecting components. The first type are recesses 53 which provide access for electrical contacts for provision of the voltages required for transportation of materials on the microchip. These recesses 53 can either fulfill the function of purely mechanical access points for electrodes, or they themselves can represent electrodes, for example by means of suitable metal-coating of the inner surface of the recesses. Furthermore, such metal-coated recesses can have an electrically-conductive connection with further electrode surfaces arranged on the microchip, in order to deliver the electrical fields used for transportation of materials. Such electrode surfaces can also be made by known coating technologies.

As a second type of connecting components on the microchip, recesses 54 can be provided for holding/deposit of materials, i.e., reagents. Again, in accordance with the specification form illustrated in FIG. 4, there is provided a second physical unit 55 which contains the necessary supply systems 56 for operation of the microchip 52. Preferably, the supply systems 56 constitute a micro-system which, by means of suitable miniaturization of the necessary components, also supplies the necessary electrical power for the necessary gas pressure via corresponding electrodes 58 (or lines/conduits 58 in the case of a pressure supply system) and also in the form of a cartridge which is inserted into module 55. In the case of electrical supply to the microchip, miniaturization of the electrical voltage supplies and circuitry can be achieved by conventional integrated technology. Similarly, in the case of supplying pressure to the channels of a microchip, such supply can be accomplished using corresponding technologies already known from the field of laboratory technology or micro-mechanics. In this context, it is also possible to integrate supply containers for the compressed-gas medium since, as already mentioned, the volumes of gas required relate only to the order of magnitude of picoliters.

In this embodiment, furthermore, the second physical unit 55 comprises an intermediate interface component 57 which has a separable connection with the supply system 56, functioning as a replaceable interface array, as shown. The intermediate interface component provides an electrical connection 60 (or connecting conduits), by means of which electrodes 58 (or conduits) of supply system 56 and the correspondingly allocated opposite electrodes 53 of the microchip can be bridged. Accordingly, connecting lines 61 can be used for bridging conduits for supplying fluids or other materials. In this case, sealing elements (not illustrated here) are necessary between lines 59 and 61. On the one hand, the above-mentioned bridging fulfills the function of avoiding the wear & tear or dirtying of the electrodes (or conduits) of supply system 56 that could inevitably arise upon contacting with the microchip, by having the intermediate component or carrier made (which would be subjected to dirtying and wear & tear) in the form of a "disposable product". Furthermore, as illustrated in this embodiment, the intermediate component or carrier can also fulfill the function of providing spatial adaptation of the electrodes of supply system 56 to the corresponding surface or spatial arrangement of the microchip electrode surfaces. This provides for an advantageous facility of achieving adaptation of the entire measurement/operating installation to a special microchip layout purely by replacement of cartridge 56 and/or intermediate interface component 57. In particular, cartridge replacement enables simple and rapid adaptation of the handling installation to various test types or various modes of operation, such as, for example, interchange between electrical supply and compressed-gas supply to the microchip, or for electrical supply to microchips having different interface layouts, e.g., reservoir patterns.

Figure 5A:
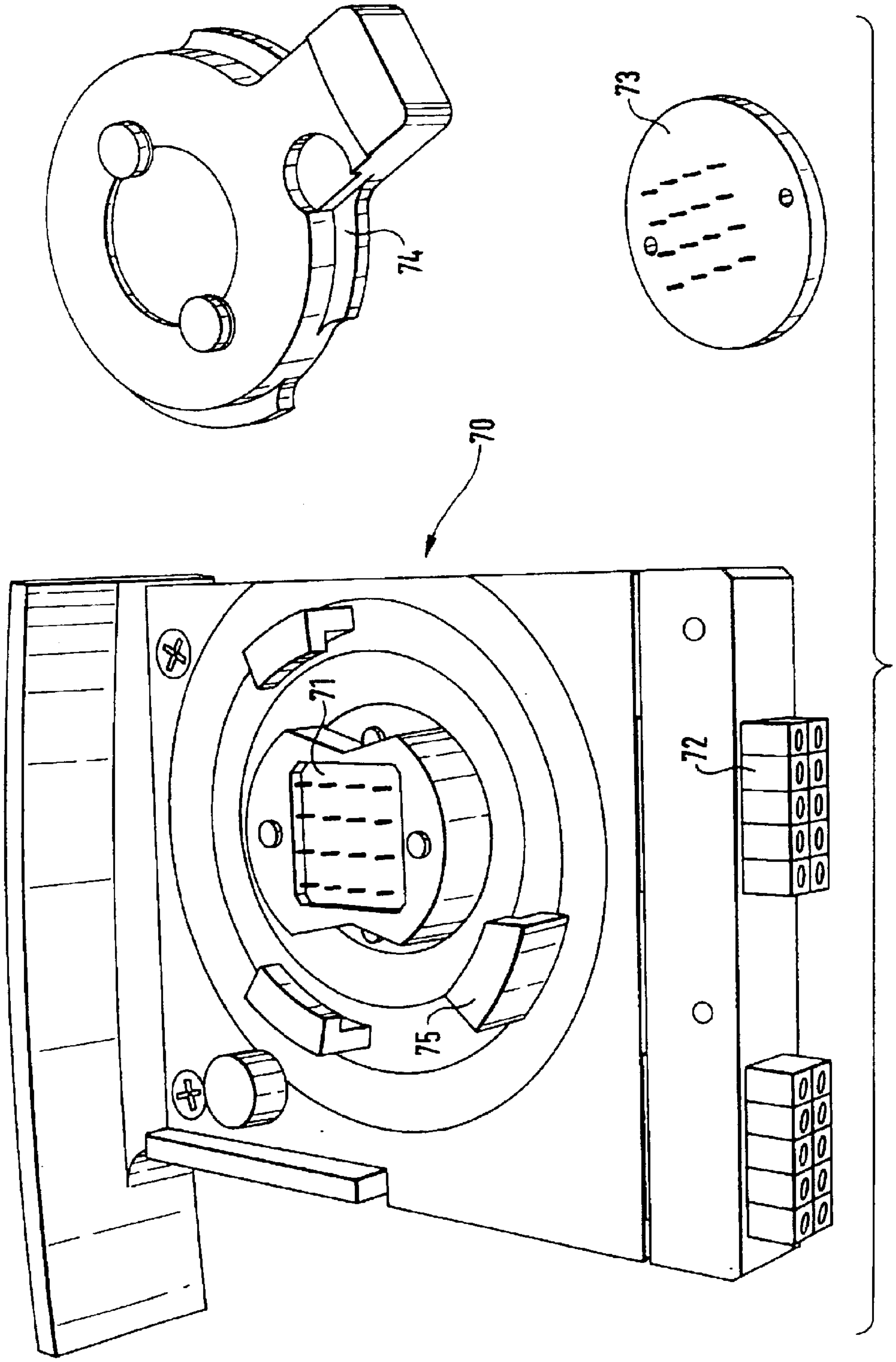
FIGS. 5a–5d schematically illustrate a sequence of images for illustration of the operation of a preferred embodiment of the invention, where a module unit according to the invention is implemented as an interchangeable cartridge.

A preferred embodiment of the invention, in which the module unit according to the invention is made as a replaceable cartridge, is illustrated by FIGS. 5*a*–5*d*. In particular, there is illustrated a sequence of images on the basis of which a typical operating cycle of the proposed system is shown. In these Figures, similar components are identified using common reference numerals. FIG. 5*a* illustrates a cartridge 70, which is integrated in a supply system (not illustrated here in closer detail) for a microchip. The supply lines (conduits) of the supply system are fed to outside by means of an appropriate contact electrode array 71, in which context this electrode array is designed in the specification example shown here as an interchangeable contact plate 71, which may, for example, be made of ceramics or polymeric materials, e.g., Teflon® material, a registered trademark of E.I. duPont de Nemours and Company, or polyimide. Using an internal basic supply system for the entire handling system (also not illustrated here), the cartridge is connected via plug-in connections 72 which interact with corresponding opposite components envisaged in the second module, in the normal way, and which activate the corresponding contact connections when the cartridge is plugged into the module.

Accordingly, the contacting of the contact electrodes of the supply system with the corresponding contacts on the microchip is performed by means of an intermediate interface component, shown as interface component 73, which, in the example shown here, bridges the contact electrodes without changing their spatial arrangement in relation to the microchip. The main advantages of this intermediate interface component 73 have already been described. The intermediate interface component has a separable connection to the cartridge by means of a bayonet connector 74, 75. For that reason, on cartridge 70 a corresponding bayonet thread 75 is provided to engage bayonet 74. Bayonet connection 74, 75 enables rapid, straightforward replacement of intermediate interface component 73, which can thus be used in the capacity of a spare part or disposable product, and can, for example, be interchanged and/or cleaned between each test cycle.

Figure 5B:
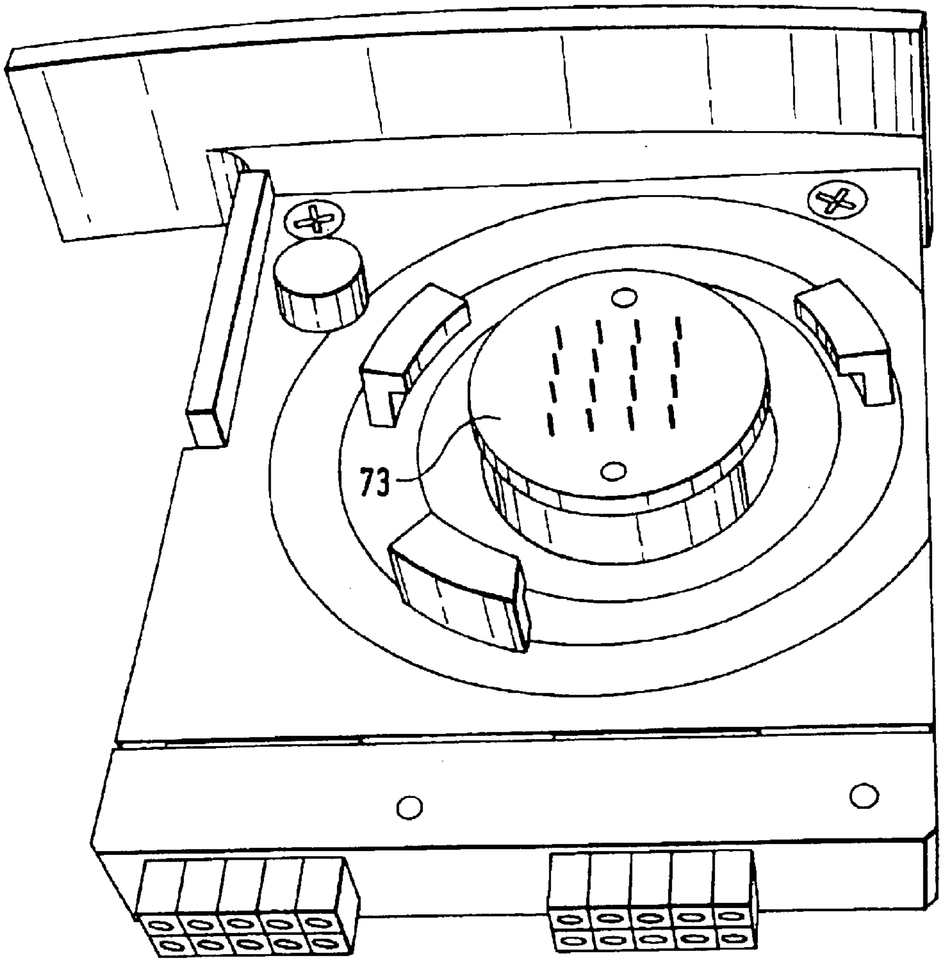
Figure 5C:
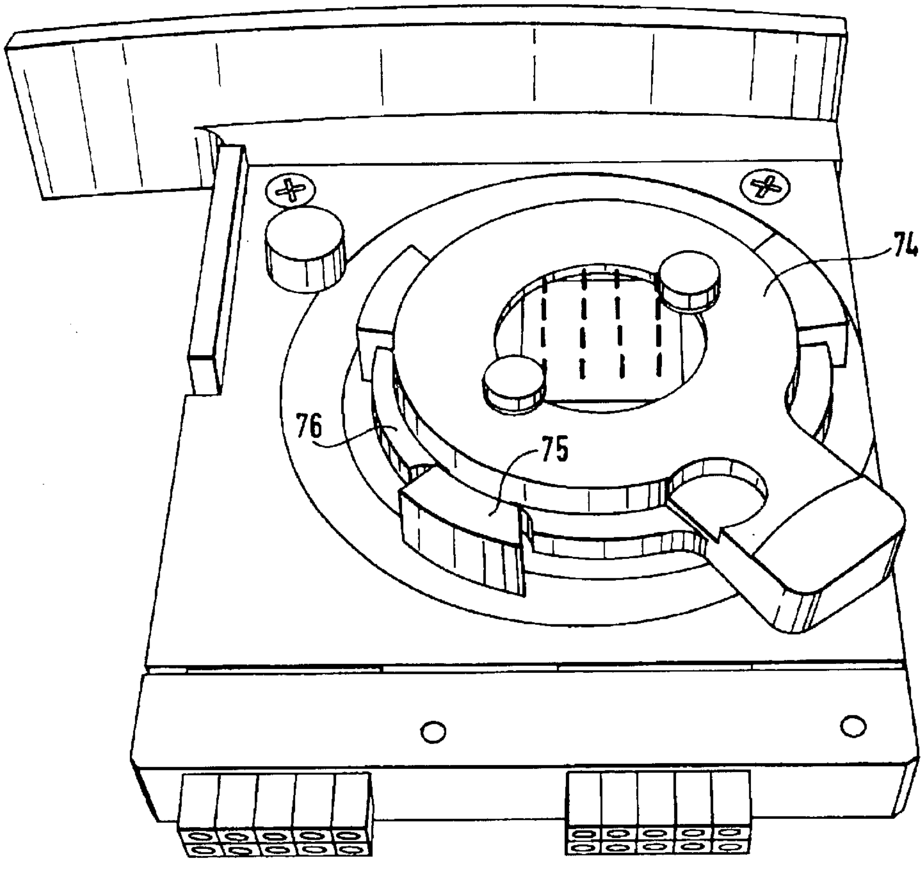

FIGS. 5*b* and 5*c* illustrate individual assembly stages for fitting of intermediate interface component 73 into a cartridge 70. In accordance with FIG. 5*b*, intermediate interface component 73 is initially inserted into cartridge 70 in the position envisaged for assembly, and then—as illustrated in FIG. 5*c*—mounted by means of bayonet connection 74, 75 on or within cartridge 70. In this context, a circular section 76 made in bayonet 74 engages in corresponding bayonet thread part 75. FIGS. 5*b* and *c* illustrate a further advantage of the cartridge proposed under the invention (module unit), i.e. that intermediate interface component 73 can, after removal of cartridge 70 from the second physical unit, be readily fitted back into cartridge 70.

Figure 5D:
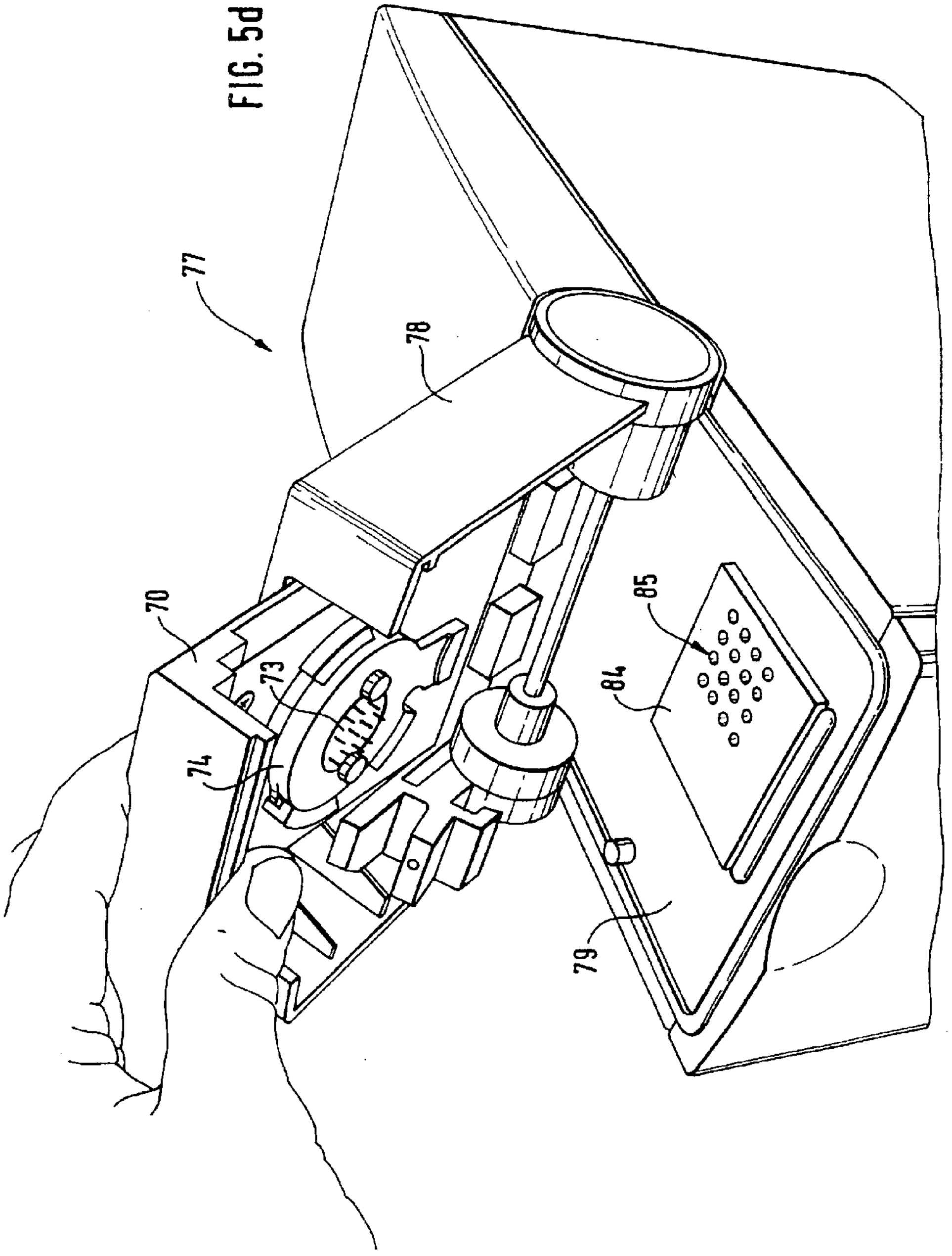

Finally, FIG. 5*d* illustrates how a correspondingly preassembled cartridge can be fitted into an equipment (instrument) housing 77 which contains all of the modules. In the specification example, which is illustrated, cartridge 70 is inserted into a slot provided in the second physical unit 78. However, other means of mounting are also conceivable, for example a snap connection or magnetic connection. By folding-down of second physical unit 78, it is brought into contact with the first physical unit 79, which fulfills the function of a previously installed microchip which is illustrated here, and thus the necessary contact connections are automatically made for operation of the microchip. In this example, the microchip is integrated into a chip casing or chip mounting 84 which provides access apertures 85 to the corresponding contacts or insertion apertures provided on the microchip which is arranged below these apertures. The illustrated arrangement of the microchip in a chip casing 84 provides further simplification of handling, and in particular with regard to fitting of the microchip and thus, overall, operation of the invention's proposed system.

Figure 6A:
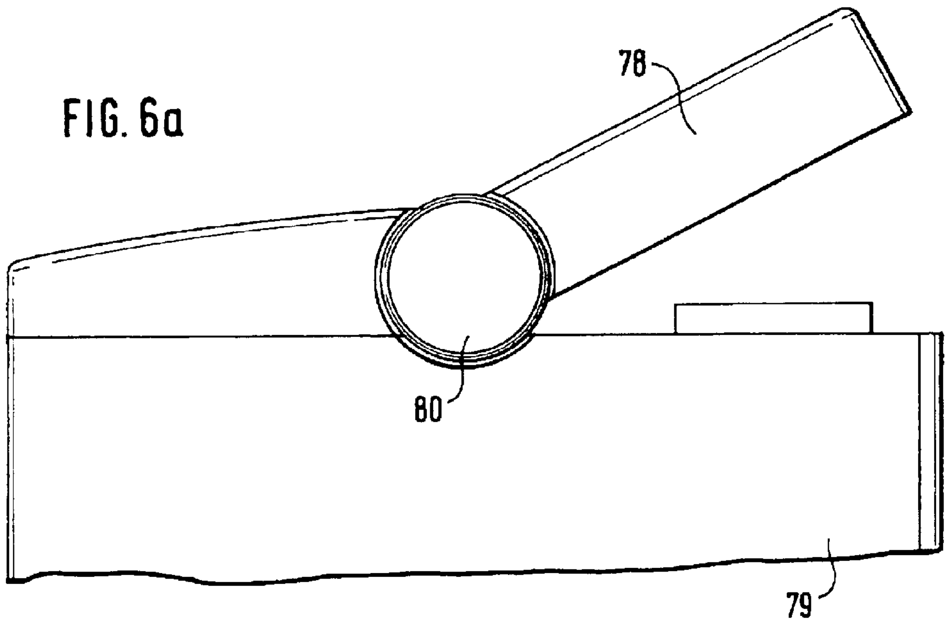
FIGS. 6a and 6b schematically illustrate an embodiment of the system according to the invention where two physical units are inter-connected by means of a hinge connection.
Figure 6B:
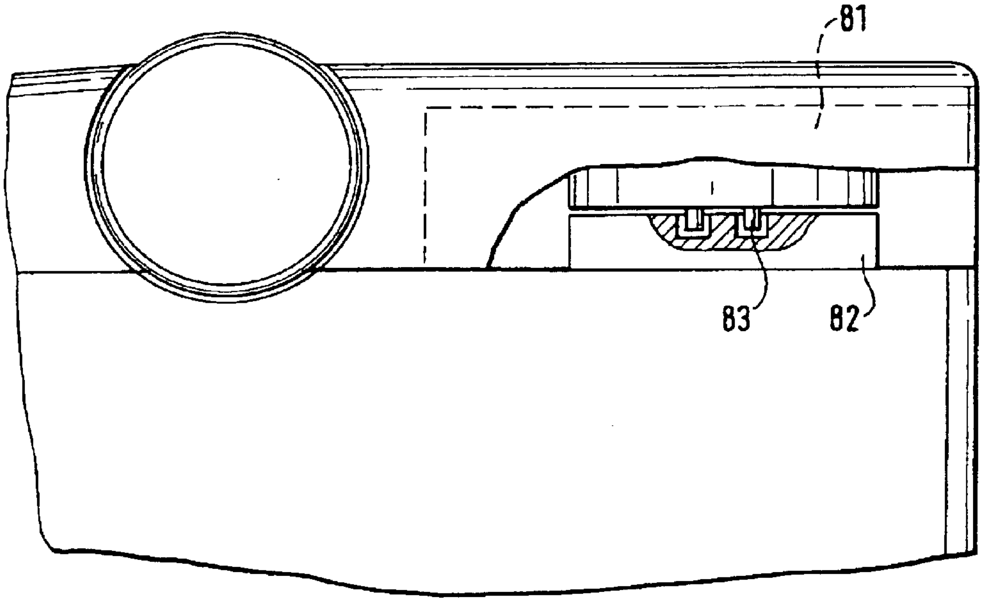

FIGS. 6*a* and 6*b* depict a diagram of an embodiment of a casing 77 corresponding to FIG. 5*d*, in which the two physical units 78, 79 according to the invention are interconnected by means of a swivel joint (hinge connection) 80. In this context, the swivel joint is advantageously arranged in spatial terms such that the contact pins 83 provided in the supply system 81 do not become offset by the recesses provided in the microchip 82 when it is inserted into them, which in the worst case would lead to unwanted damage to contact pins 83 or even damage to the microchip 82.

All publications and patent applications are herein incorporated by reference to the same extent as if each individual publication or patent application was specifically and individually indicated to be incorporated by reference. Although the present invention has been described in some detail by way of illustration and example for purposes of clarity and understanding, it will be apparent that certain changes and modifications may be practiced within the scope of the appended claims.

What is claimed is:

1. A system for analysis or synthesis of materials, comprising:

a first physical unit, comprising a mounting region for receiving a microfluidic device;

at least one second physical unit spatially separated from the first physical unit and comprising a material transport system that includes at least a first interface component;

wherein the first physical unit and second physical unit are oriented with respect to each other whereby the material transport system provides a potential to the microfluidic device through the first interface component to transport material through the microfluidic device; and wherein the first interface component is removable from the second physical unit.

2. The system of claim 1, wherein the material transport system is oriented within the second physical unit to provide at least one fluid to the microfluidic device in the mounting region of the first physical unit.

3. The system of claim 2, wherein the first interface component and the material transport system comprise at least one common conduit disposed in the second physical unit, the at least one conduit providing both a potential for moving material and at least a first fluid to the microfluidic device.

4. The system of claim 1, further comprising a control unit operably coupled to the first interface component for controlling application of the potential to the microfluidic device.

5. The system of claim 3, further comprising a control unit operably coupled to the material transport system, for controlling supply of fluid to the microfluidic device.

6. The system of claim 1, wherein the first interface component comprises a sensor for measuring an electrical voltage within the microfluidic device.

7. The system of claim 1, further comprising at least a second interface component, the second interface component providing at least one of potential and fluid to the microfluidic device.

8. The system of claim 7, wherein the second interface component is removably attached to the second physical unit.

9. The system of claim 8, wherein the second interface component is mounted on the first interface component by a bayonet fitting.

10. The system of claim 1, wherein the first physical unit further comprises a detector disposed therein, the detector being positioned to detect signals from the microfluidic device on the mounting region.

11. The system of claim 1, wherein the mounting region is open from the top for placing a microfluidic device on the mounting region.

12. The system of claim 1, further comprising a microfluidic device received in the mounting region of the first physical unit.

13. The system of claim 1, wherein the material transport system is arranged within a module unit which is separably connectable with the second physical unit.

* * * * *